(12) United States Patent
Ishii

(10) Patent No.: US 6,886,066 B2
(45) Date of Patent: Apr. 26, 2005

(54) METHOD AND APPARATUS FOR SHARING SIGNAL PINS ON AN INTERFACE BETWEEN A SYSTEM CONTROLLER AND PERIPHERAL INTEGRATED CIRCUITS

(75) Inventor: Koji Ishii, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 09/975,202

(22) Filed: Oct. 11, 2001

(65) Prior Publication Data

US 2003/0074510 A1 Apr. 17, 2003

(51) Int. Cl.[7] .............................................. G06F 13/14
(52) U.S. Cl. ...................................... 710/305; 710/316
(58) Field of Search ................................. 710/305, 306, 710/310, 316, 317

(56) References Cited

U.S. PATENT DOCUMENTS

| | | | | | |
|---|---|---|---|---|---|
| 4,756,006 A | * | 7/1988 | Rickard | ...................... | 375/219 |
| 5,357,624 A | * | 10/1994 | Lavan | ........................ | 711/115 |
| 5,363,494 A | * | 11/1994 | Kudou | ........................ | 710/307 |
| 6,044,412 A | * | 3/2000 | Evoy | ............................ | 710/14 |
| 6,324,596 B1 | * | 11/2001 | Houg | ........................... | 710/19 |
| 6,378,008 B1 | * | 4/2002 | Gradinariu | ..................... | 710/7 |
| 2001/0005225 A1 | * | 6/2001 | Clark et al. | ................. | 348/302 |
| 2002/0052990 A1 | * | 5/2002 | Chan et al. | ................... | 710/73 |

* cited by examiner

*Primary Examiner*—Sumati Lefkowitz
*Assistant Examiner*—Trisha Vu
(74) *Attorney, Agent, or Firm*—Weiss, Moy & Harris, P.C.; Andrew M. Harris; Casimer K. Salys

(57) ABSTRACT

A method and apparatus for sharing signal pins on an interface between a system controller and peripheral integrated circuits reduces the number of signal pins required on a system controller integrated circuit. Signals of differing types are qualified by an internal peripheral select signal from which chip select signals for a plurality of externally interfaced peripheral integrated circuits are generated. The interface functions so that a single signal pin may be used for carrying different signal types between the system controller and each of the peripheral integrated circuits. The use of the internal peripheral select signal ensures that the setup times for the selection circuitry and pin drivers are met before a chip select signal enables communication with a selected peripheral and that a hold time is maintained for signals on shared interface pins so that the peripheral integrated circuits receive valid inputs from shared pins.

6 Claims, 4 Drawing Sheets

METHOD AND APPARATUS FOR SHARING SIGNAL PINS ON AN INTERFACE BETWEEN A SYSTEM CONTROLLER AND PERIPHERAL INTEGRATED CIRCUITS

BACKGROUND OF THE INVENTION

1. Technical Field

The present invention relates generally to interface signaling, and more particularly, to an interface between a system controller integrated circuit and a plurality of peripheral integrated circuits.

2. Description of the Related Art

Interfaces between present-day integrated circuits have increased in density and variety. In particular, computer systems peripheral components have interfaces that differ based upon the type of peripheral, and all of the peripheral components may have many connections.

Typically, the width of an address and data bus for interconnecting peripheral components to a system controller is determined by the maximum number of address signals and the maximum number of data signals. The width of a control bus may depend upon the variety of control mechanisms used to interface the various peripheral integrated circuits. For example, a memory device may require a read/write line and a strobe line, while an Input/Output (I/O) controller may require a read strobe and a write strobe. Therefore, the total number of interface signals for connection to a group of peripheral devices generally reaches the maximum data and address set plus a variety of control signals that includes all of the required "flavors", plus a plurality of chip select signals for selecting between the particular peripheral integrated circuits.

Since the above signals have different setup and timing requirements, it is not practical for the logic that generates these signals to shift functions between the functions required for the various peripherals, for example, a memory IC requiring 16 address lines sets a minimum number of address lines in a typical interface to 16. A secondary connection of a bus controller that requires only 5 address lines leaves 11 of the address lines provided on the interface unused for the purposes of interfacing the bus controller. Further for example, if the bus controller requires 6 high-speed control lines and the memory IC requires only 2, but of completely differing types, 8 control signal lines must be provided on the interface. The above design yields 13 unused signal lines during interfaces to the bus controller and 6 unused control lines during interfaces to the memory.

It is therefore desirable to provide a method and apparatus for sharing pins between disparate signals on an interface to a plurality of peripheral integrated circuits.

SUMMARY OF THE INVENTION

The objective of sharing an interface pin between disparate signals is accomplished in a method and apparatus for interfacing a system controller integrated circuit and a plurality of peripheral integrated circuits. The interface circuit shares an interface pin by selecting between circuits for communicating with each of the peripheral integrated circuits. The selection is made by a signal within the system controller integrated circuit that provides sufficient setup and hold times for signals on the interface pin such that they are consistent with the setup and hold time requirements of the peripheral integrated circuits.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
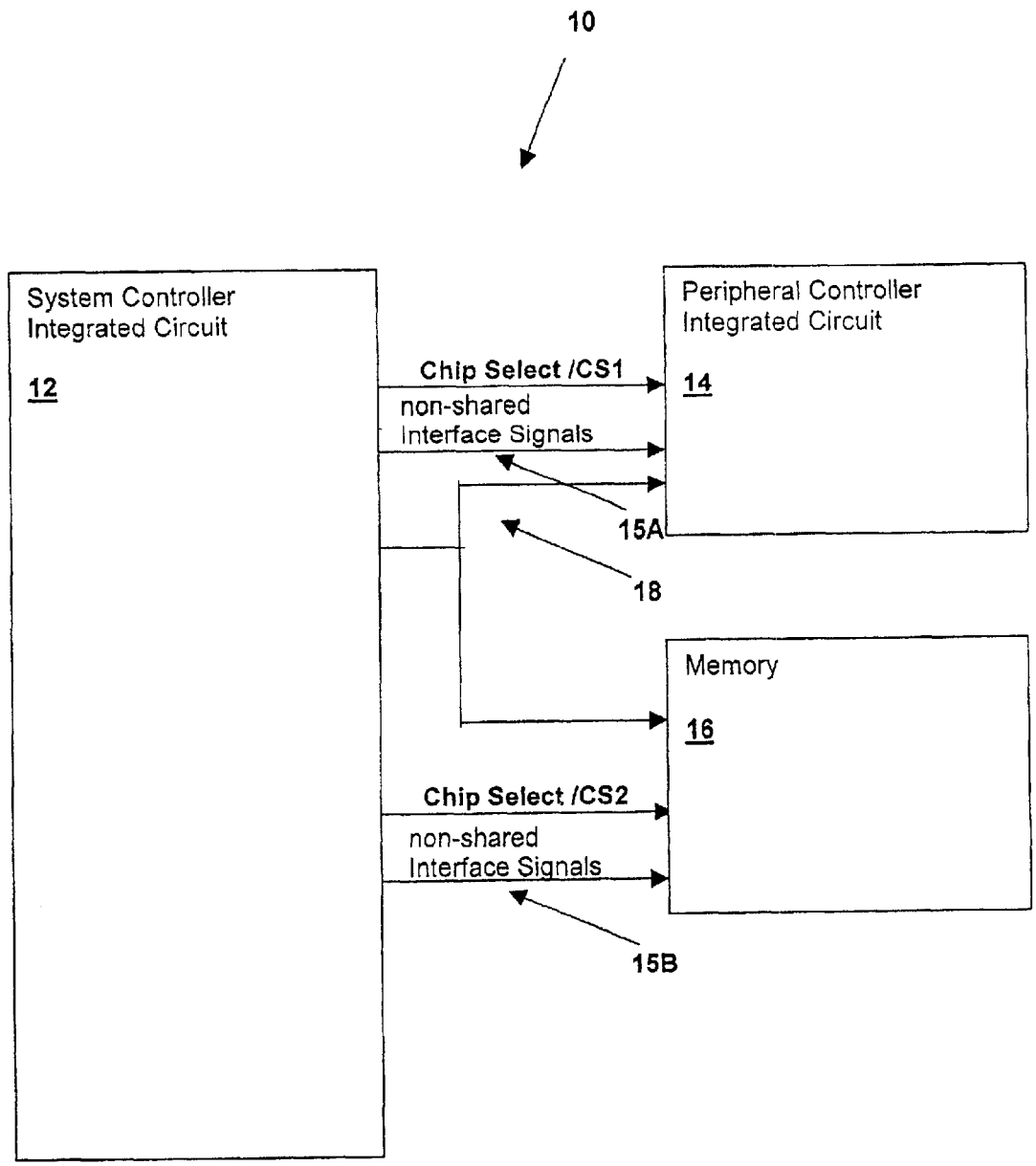
FIG. 1 is a block diagram of an interface in accordance with a preferred embodiment of the invention.

With reference now to the figures, and in particular with reference to FIG. 1, there is depicted a block diagram of an interface 10 in accordance with an embodiment of the invention. A system controller integrated circuit provides an interface 10 for connection to a plurality of peripheral integrated circuits, which may include memories or other system components. In the exemplary embodiment, the peripheral integrated circuits include a peripheral controller integrated circuit 14 and a memory 16. Peripheral integrated circuit 14 and memory 16 share peripheral interface signals 18, and in contrast to the prior art, the shared signals 18 include common connections of at least one shared pin on system controller integrated circuit 12 to pins of differing signal types on peripheral integrated circuit 14 and memory 16. The exemplary embodiment depicts two peripheral components, but in practice the number of peripheral components sharing pins via shared interface signals 18 will be dictated by particular design requirements and fan-out capabilities.

Peripheral integrated circuit 14 may be of various types, for example, a Personal Computer Memory Card International Association (PCMCIA) bus controller, other bus controller or a direct peripheral control device such as a Integrated Drive Electronics (IDE) controller. The one requirement for the application of the interface circuits of the present invention is that all of the peripheral integrated circuits (including memories such as memory 16 or other devices) sharing an interface pin have a chip-select mechanism whereby the shared interface signal connections 18 to peripheral integrated circuits are isolated from those circuits that are not selected. The isolation means that unselected peripherals will not generate any activity on the shared signals or react via internal state changes to variations on the shared signals. Interface 10 may include unshared signals 15A and 15B depending on system requirements.

Figure 2:
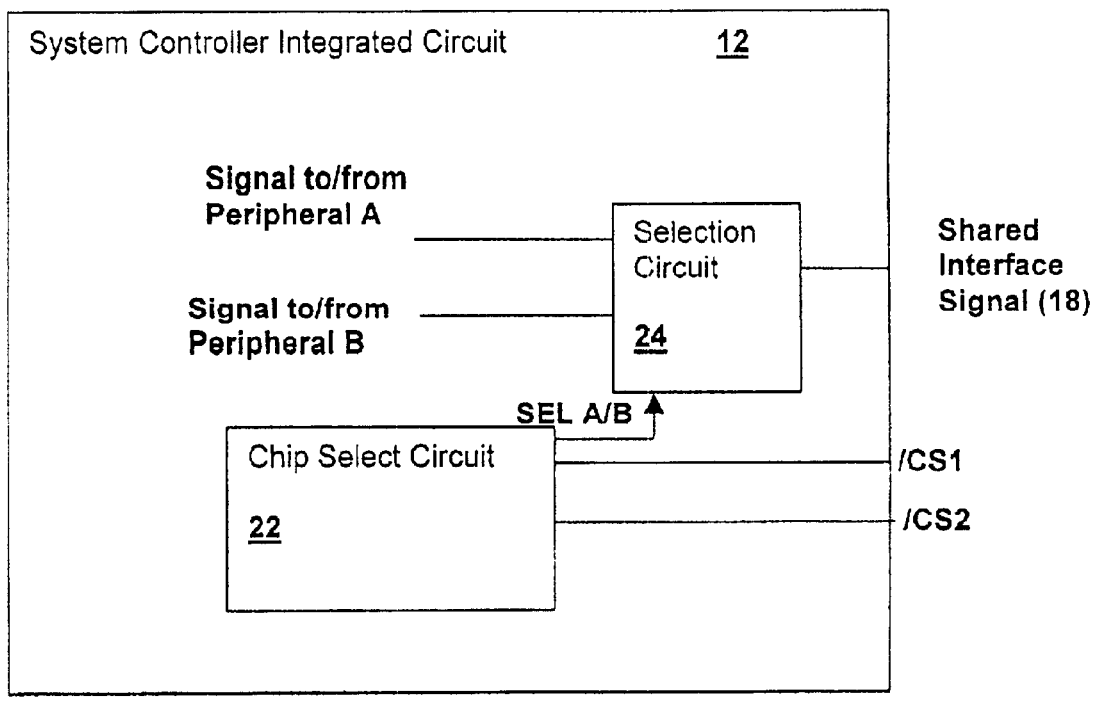
FIG. 2 is a schematic diagram of a system controller interface circuit with a preferred embodiment of the invention.

Referring now to FIG. 2, details of system controller integrated circuit 12 in accordance with an embodiment of the invention are depicted. Internal to system controller integrated circuit 12, signals are generated for interface to peripheral A and peripheral B and are coupled to a selection circuit 24 for selecting between the signals for output to a shared interface signal 18. The select input of selection circuit 24 is coupled to an internally generated peripheral select signal SEL A/B provided by a chip select control circuit 22. Select signal SEL A/B is a signal used by chip select control circuit 22 to generate the actual chip select signals /CS1 and /CS2 and has leading-edge timing sufficient advanced from the chip select signals so that selection circuit 24 (which includes the pin driver for the shared interface signal if the shared interface signal is an output) can provide the proper signal to the shared interface pin for the peripheral to be selected. Further, select signal SEL A/B must remain valid after the trailing edges of the chip select signals so that the proper signal is maintained on the shared interface pin to meet the hold time requirements of all of the peripheral integrated circuits. While the exemplary embodiment depicted in FIG. 2 shows only one shared interface signal shared between two peripherals, the sharing of interface signals is extensible to multiple peripherals (as described above) sharing multiple signals.

Figure 3A:
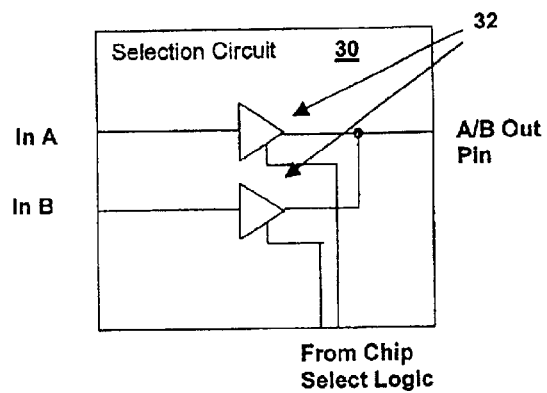
FIGS. 3A–3D are schematic diagrams of selection circuits in accordance with various embodiments of the invention.

Referring now to FIGS. 3A–3D, a variety of implementations of selection circuits in accordance with various embodiments of the invention are shown. FIG. 3A shows an implementation of an output-only circuit wherein the shared signal is an output to both peripheral A and peripheral B. Two input signals (In A and In B) are received by a selection circuit 30, which includes two tri-state buffers 32. The tri-state buffer signals are coupled to the chip select logic and the chip select logic enables the appropriate tri-state buffer 32 corresponding to the input signal required by a peripheral, prior to selecting that peripheral by generating the peripheral chip select signal. As described above, the selection is made by an internal signal used to generate the chip select signals, so that the appropriate tri-state buffer 32 will be enabled prior to the external chip select enabling the selected peripheral integrated circuit and stay enabled after the chip select signal disables the selected peripheral integrated circuit. The maximum setup time and the maximum hold time required among the set of peripheral integrated circuits sharing a connection to an interface pin determine the setup and hold time required between the leading and trailing edge of the chip select signals and the window in which the tri-state buffers are enabled.

Figure 3B:
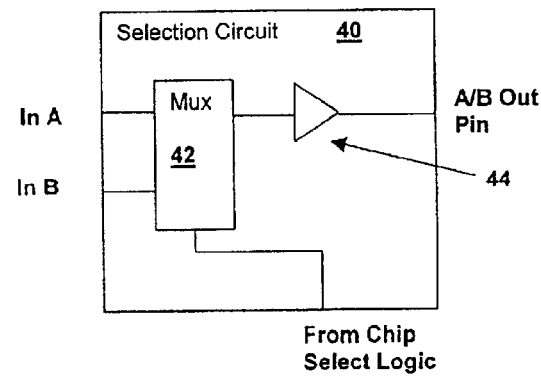

FIG. 3B depicts an alternative embodiment of an output-only selection circuit 40. Selection circuit 40 includes a multiplexer 42 coupled to the peripheral select signal from the chip select logic for selecting between signals In A and In B. Multiplexer 42 is coupled to an output driver 44 for driving the appropriate selected signal on a shared interface pin.

Figure 3C:
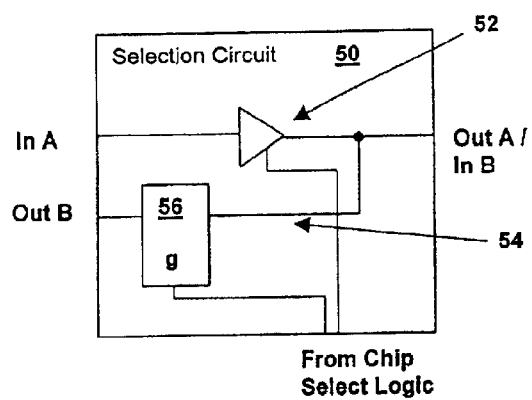

FIG. 3C depicts a selection circuit 50 for sharing a signal that is an output from one peripheral integrated circuit and an input to a second peripheral integrated circuit. A tri-state buffer 52 is used to isolate signal In A from the shared output pin (Out A/In B) when peripheral A is not selected. A transparent latch 56 may be used to gate and hold a signal from the shared interface pin by enabling transparent latch 56 when peripheral B is selected (Similarly, an input-only selection circuit may use two transparent latches to implement this feature for two input signals).

Figure 3D:
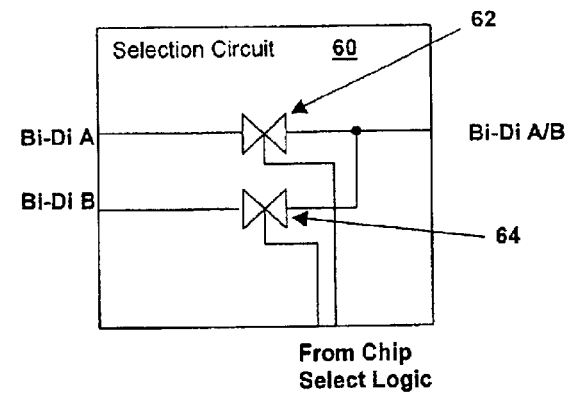

FIG. 3D depicts a selection circuit 60 for sharing a pair of bi-directional signals. A transmission gate 62 is used to isolate signal Bi-Di A/B to and from internal node Bi-Di A when peripheral A is not selected. A second transmission gate 64 is used to isolate Bi-Di A/B to and from internal node Bi-Di B when peripheral B is not selected. In the bi-directional signal sharing implementations, the circuits coupled to internal node Bi-Di A and internal node Bi-Di B must not require input from these nodes when the associated peripheral is not selected, or additional signals providing information regarding direction (output or input) on the shared pin need to be accessible to the pin-sharing circuitry to provide latching of input states when a bi-directional signal is in an input state.

Figure 4:
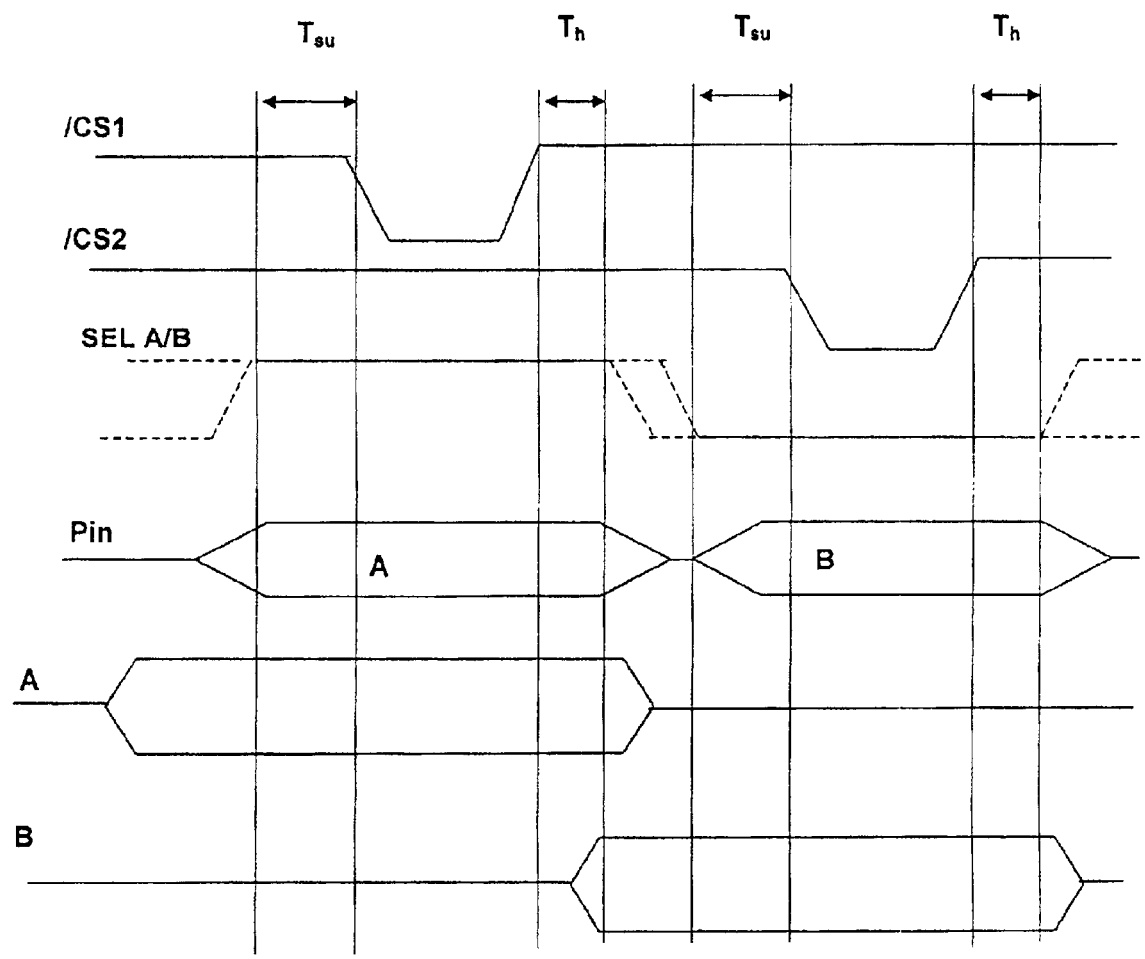
FIG. 4 is a timing diagram depicting signals within the interface of FIG. 1.

Referring now to FIG. 4, signals within a system controller integrated circuit in accordance with an embodiment of the present invention are depicted in a timing diagram. Prior to the assertion of chip select signal /CS1 (transition to logic low state), peripheral select signal SEL A/B is in a logic high state, selecting peripheral A. Peripheral A is selected for a setup time $T_{su}$ that is determined by the maximum setup time requirements among the set of peripheral components sharing an interface pin. While the specific timing requirements of setup and hold time are particular to each peripheral integrated circuit, for the purpose of design simplicity, it is convenient to have a stable setup and hold time common to the entire set of peripheral integrated circuits sharing an interface pin or among the peripherals sharing the entire set of interface pins. An input signal A is valid before /CS1 is asserted and is coupled to the shared interface signal Pin and must meet the setup time requirements for peripheral A, Similarly, input signal B is valid before chip select signal /CS2 is asserted and SEL A/B selects peripheral B for interface to shared interface signal Pin, causing input signal B to be coupled to interface signal Pin. After de-assertion of chip select signals CS1 and CS2 peripheral select signal SEL A/B must remain valid for a hold time $T_h$ that is determined by the maximum hold time requirement among the set of peripheral components sharing interface signal Pin.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. An interface circuit for interfacing a system controller integrated circuit and a plurality of peripheral integrated circuits, said interface circuit comprising:

a node within said system controller integrated circuit commonly connected to a first and a second one of said plurality of peripheral integrated circuits;

first switch means for selectively connecting said node to a first circuit of the system controller integrated circuit for communicating signals with reference to said first peripheral integrated circuit;

second switch means for selectively connecting said node to a second circuit of the system controller integrated circuit for communicating signals with reference to said second peripheral integrated circuit;

signal means for early enabling and late disabling of said first and second switch means consistent with setup and hold times of the respective first and second peripheral integrated circuits, and wherein said node is a bi-directional interface pin for interfacing bi-directional signals to said first peripheral integrated circuit, wherein first peripheral integrated circuit includes bi-directional input/output connections, wherein said first switch means comprises a transmission gate having a select input coupled to said signal means, a first terminal connected to said node and a second terminal coupled to said first circuit, and wherein said node is further a bi-directional interface pin for interfacing bi-directional signals to said second peripheral integrated circuit and said second switch means comprises a transmission gate having a select input coupled to said signal means, a first terminal connected to said node and a second terminal coupled to said second circuit.

2. An interface circuit for interfacing a system controller integrated circuit and a plurality of peripheral integrated circuits, said interface circuit comprising:

a node within said system controller integrated circuit commonly connected to a first and a second one of said plurality of peripheral integrated circuits;

first switch means for selectively connecting said node to a first circuit of the system controller integrated circuit for communicating signals with reference to said first peripheral integrated circuit;

second switch means for selectively connecting said node to a second circuit of the system controller integrated circuit for communicating signals with reference to said second peripheral integrated circuit;

signal means for early enabling and late disabling of said first and second switch means consistent with setup and hold times of the respective first and second peripheral integrated circuits;

first chip select signal means coupled to said first peripheral integrated circuit for enabling communication with said first peripheral integrated circuit; and second chip select signal means coupled to said second peripheral integrated circuit for enabling communication with said second peripheral integrated circuit, and wherein said first switch means comprises a first transparent latch having a gate input coupled to said first chip select signal means, whereby a state of said node may be maintained at said first peripheral integrated circuit when said first chip select signal means deselects communication with said first peripheral integrated circuit.

3. The interface circuit of claim 2, wherein said node is a pin for receiving a first signal from said first peripheral integrated circuit and transmitting a second signal to said second peripheral integrated circuit, and wherein said second switch means comprises a tri-state buffer having an enable input coupled to said second chip select signal means and an input coupled to said node and an output coupled to said second peripheral integrated circuit.

4. The interface circuit of claim 2, wherein said second switch means comprises a second transparent latch having a gate input coupled to said second chip select signal means, whereby a state of said node may be maintained at said second circuit when said signal means deselects said second peripheral integrated circuit.

5. An interface circuit for interfacing a system controller integrated circuit and a plurality of peripheral integrated circuits, said interface circuit comprising:

a node within said system controller integrated circuit commonly connected to a first and a second one of said plurality of peripheral integrated circuits;

a selector for selectively connecting said node to one of a first circuit of the systems controller integrated circuit for communicating signals with reference to said first peripheral integrated circuit and a second circuit of the systems controller integrated circuit for communicating signals with reference to said second peripheral integrated circuit;

a chip select circuit providing a first chip select output for connection to a first chip select input of said first peripheral integrated circuit and a second chip select output for connection to a second chip select input of said second peripheral integrated circuit and an selection signal connected to said selector, wherein said selection signal is set to a state for selecting one of said first circuit and said second circuit at a time preceding assertion one of said chip select signals by a time greater than or equal to a maximum setup time among said first and second peripheral integrated circuits and is maintained in than state until said asserted one of said chip select signals is de-asserted and a time greater than or equal to a maximum hold time among said first and second peripheral integrated circuits has elapsed, and wherein said node is a bi-directional interface pin for interfacing a bi-directional signal to and from said first peripheral integrated circuit, wherein said first circuit includes a bi-directional input/output connection, and wherein said selector comprises a transmission gate having a select input coupled to said chip select circuit, a first terminal connected to said node and a second terminal coupled to said first circuit; and a transparent latch having an input coupled to an output of said selector, whereby a state of said node that reflects an output of said selected one of said peripheral integrated circuits is held after said asserted one of said chip select signals is de-asserted.

6. The interface circuit of claim 5, wherein said selector further comprises a second transmission gate having a select input coupled to said chip select circuit, a first terminal connected to said node and a second terminal coupled to a bi-directional signal of said second circuit.

* * * * *